United States Patent
Kuo et al.

(10) Patent No.: US 9,310,990 B2
(45) Date of Patent: Apr. 12, 2016

(54) PORTABLE ELECTRONIC DEVICE AND METHOD OF CONTROLLING SAME

(75) Inventors: Margaret Elizabeth Kuo, Kitchener (CA); Thomas Jan Stovicek, San Francisco, CA (US); Yoojin Hong, Palo Alto, CA (US); Michael George Langlois, Almonte (CA); Henry Chen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 974 days.

(21) Appl. No.: 13/094,436

(22) Filed: Apr. 26, 2011

(65) Prior Publication Data

US 2011/0260970 A1    Oct. 27, 2011

Related U.S. Application Data

(60) Provisional application No. 61/328,136, filed on Apr. 26, 2010.

(51) Int. Cl.
| | |
|---|---|
| G09G 5/00 | (2006.01) |
| G06F 3/041 | (2006.01) |
| G06F 3/033 | (2013.01) |
| G06F 3/0488 | (2013.01) |
| H04M 1/725 | (2006.01) |

(52) U.S. Cl.
CPC ......... *G06F 3/0488* (2013.01); *H04M 1/72552* (2013.01); *H04M 1/72561* (2013.01)

(58) Field of Classification Search
CPC ...................................................... G06F 3/0488
USPC ........................................... 715/863; 345/161
See application file for complete search history.

(56) References Cited

U.S. PATENT DOCUMENTS

| | | | |
|---|---|---|---|
| 7,360,167 B2 | 4/2008 | Hennum et al. | |
| D573,153 S | 7/2008 | Roever et al. | |
| D582,926 S | 12/2008 | Blankenship et al. | |
| 7,574,672 B2 | 8/2009 | Jobs et al. | |
| 7,584,429 B2 | 9/2009 | Fabritius | |
| D724,619 S | 3/2015 | Nguyen | |
| 2004/0155909 A1* | 8/2004 | Wagner | 345/854 |
| 2006/0020904 A1 | 1/2006 | Aaltonen et al. | |
| 2006/0209040 A1* | 9/2006 | Garside et al. | 345/173 |
| 2007/0157094 A1 | 7/2007 | Lemay et al. | |
| 2007/0252822 A1 | 11/2007 | Kim | |
| 2009/0249247 A1* | 10/2009 | Tseng et al. | 715/808 |

(Continued)

FOREIGN PATENT DOCUMENTS

| | | |
|---|---|---|
| EP | 2312427 A2 | 4/2011 |
| JP | EP2068236 A1 | 6/2009 |
| TW | EP1879365 A2 | 1/2008 |

OTHER PUBLICATIONS

PCT International Search Report and Written Opinion from related PCT/CA2011/000627; Sep. 21, 2011; 11 pages.

*Primary Examiner* — Kathy Wang-Hurst
*Assistant Examiner* — Peijie Shen
(74) *Attorney, Agent, or Firm* — Donna Flores; Fleit Gibbons Gutman Bongini & Bianco P.L.

(57) ABSTRACT

A method includes displaying a shutter adjacent to a boundary of an information display region on a display of a portable electronic device, the information display region for displaying first information; receiving an input associated with the shutter; and displaying second information.

7 Claims, 9 Drawing Sheets

(56) References Cited

U.S. PATENT DOCUMENTS

| | | | |
|---|---|---|---|
| 2009/0327976 A1* | 12/2009 | Williamson et al. | 715/863 |
| 2010/0017173 A1 | 1/2010 | Fabin et al. | |
| 2010/0323762 A1* | 12/2010 | Sindhu | 455/566 |
| 2011/0102455 A1* | 5/2011 | Temple | 345/619 |

* cited by examiner

PORTABLE ELECTRONIC DEVICE AND METHOD OF CONTROLLING SAME

FIELD OF TECHNOLOGY

The present disclosure relates to portable electronic devices and the control of such portable electronic devices.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output.

BRIEF DESCRIPTION OF THE DRAWINGS

Embodiments of the present disclosure will now be described, by way of example only, with reference to the attached figures, wherein.

DETAILED DESCRIPTION

Figure 1:
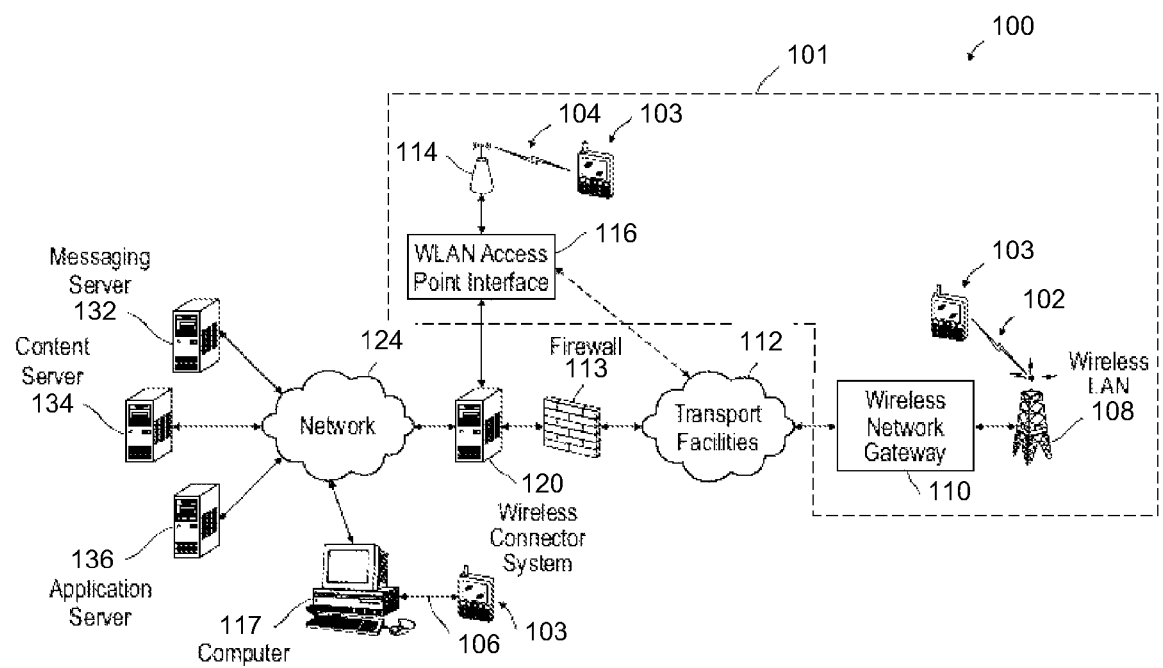
FIG. 1 illustrates a communication system including portable electronic devices.

The following describes an apparatus for and method of controlling a portable electronic device. When the method is performed, second information may be displayed when a shutter is selected. The second information may receive input to modify first information that is displayed in the display region.

In an aspect there is provided, a method including: displaying a shutter adjacent to a boundary of an information display region on a display of a portable electronic device, the information display region for displaying first information; receiving an input associated with the shutter; and displaying second information.

In another aspect there is provided, a portable electronic device including: a display configured to display a shutter adjacent to a boundary of an information display region on the display, the information display region for displaying first information; and a processor connected to the touch-sensitive display to: receiving an input associated with the shutter; and displaying second information.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Referring to FIG. 1, a communication system 100 in which embodiments of the technology can be applied is generally shown. The communication system 100 may include a number of portable electronic devices 103 that may be connected to the remainder of system 100 in any of several different ways. Accordingly, several instances of portable electronic devices 103 are depicted in FIG. 1 employing different example ways of connecting to system 100. FIG. 1 is provided by way of example only, and those persons skilled in the art will appreciate that additional elements and modifications may be necessary to make the portable electronic device, e.g., 103 work in particular network environments. While in the illustrated embodiments, the portable electronic devices, e.g., 103 may comprise smart phones, in other embodiments, however, the portable electronic devices may comprise personal digital assistants (PDA), tablet computers, laptop computers, desktop computers, servers, or other portable electronic devices capable of sending and receiving electronic messages.

Portable electronic devices 103 are connected to a wireless network 101 that may comprise one or more of a Wireless Wide Area Network (WWAN) 102 and a Wireless Local Area Network (WLAN) 104 or other suitable network arrangements. In some embodiments, the portable electronic devices 103 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 where each of the base stations 108 provides wireless Radio Frequency (RF) coverage to a corresponding area or cell. The WWAN 102 is typically operated by a mobile network service provider that provides subscription packages to users of the portable electronic devices 103. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN)

and other similar technologies for providing coordinated service wirelessly over an area larger than that covered by typical WLANs.

The WWAN 102 may further comprise a wireless network gateway 110 that connects the portable electronic devices 103 to transport facilities 112, and through the transport facilities 112 to a wireless connector system 120. Transport facilities may include one or more private networks or lines, the Internet, a virtual private network, or any other suitable network. The wireless connector system 120 may be operated, for example, by an organization or enterprise such as a corporation, university, or governmental department, which allows access to a network 124 such as an internal or enterprise network (e.g., an intranet) and its resources, or the wireless connector system 120 may be operated by a mobile network provider. In some embodiments, the network 124 may be realized using the Internet rather than or in addition to an internal or enterprise network.

The wireless network gateway 110 provides an interface between the wireless connector system 120 and the WWAN 102, which facilitates communication between the portable electronic devices 103 and other devices (not shown) connected, directly or indirectly, to the WWAN 102. Accordingly, communications sent via the portable electronic devices 103 are transported via the WWAN 102 and the wireless network gateway 110 through transport facilities 112 to the wireless connector system 120. Communications sent from the wireless connector system 120 are received by the wireless network gateway 110 and transported via the WWAN 102 to the portable electronic devices 103.

The WLAN 104 comprises a wireless network that, in some embodiments, conforms to IEEE 802.11x standards (sometimes referred to as Wi-Fi™) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 that may connect to the wireless connector system 120 directly (for example, if the access point 114 is part of an enterprise WLAN 104 in which the wireless connector system 120 resides), or indirectly as indicated by the dashed line in FIG. 1 via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed portable electronic devices 103. The wireless connector system 120 also provides administrative control and management capabilities over users and portable electronic devices 103 that may connect to the wireless connector system 120.

The wireless connector system 120 allows the portable electronic devices 103 to access the network 124 and connected resources and services such as a messaging server 132 (for example, a Microsoft Exchange Server®, IBM Lotus Domino®, or Novell GroupWise™ email server), a content server 134 for providing content such as Internet content or content from an organization's internal servers, application servers 136 for implementing server-based applications such as instant messaging (IM) applications to portable electronic devices 103, and intranet file services.

The wireless connector system 120 typically provides a secure exchange of data (e.g., email messages, personal information manager (PIM) data, and IM data) with the portable electronic devices 103. In some embodiments, communications between the wireless connector system 120 and the portable electronic devices 103 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the portable electronic devices 103, and can typically be regenerated by the user on portable electronic devices 103. Data sent to the portable electronic devices 103 is encrypted by the wireless connector system 120 using the private encryption key retrieved from the user's mailbox. The encrypted data, when received on the portable electronic devices 103, is decrypted using the private encryption key stored in memory. Similarly, data sent to the wireless connector system 120 from the portable electronic devices 103 is encrypted using the private encryption key stored in the memory of the portable electronic devices 103. The encrypted data, when received on the wireless connector system 120, is decrypted using the private encryption key retrieved from the user's mailbox.

The wireless network gateway 110 is adapted to send data packets received from the portable electronic devices 103 over the WWAN 102 to the wireless connector system 120. The wireless connector system 120 then sends the data packets to the appropriate connection point such as the messaging server 132 or content servers 134 or application server 136. Conversely, the wireless connector system 120 sends data packets received, for example, from the messaging server 132 or content servers 134 or application servers 136 to the wireless network gateway 110 that then transmit the data packets to the destination portable electronic devices 103. The AP interfaces 116 of the WLAN 104 provide similar sending functions between the portable electronic devices 103, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination. A portable electronic devices 103 may alternatively connect to the wireless connector system 120 using a computer 117, such as desktop or notebook computer, via the network 124. A link 106 may be provided for exchanging information between the portable electronic devices 103 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the portable electronic devices 103 and computer 117. The short-range wireless communication interface may be a personal area network (PAN) interface. A Personal Area Network is a wireless point-to-point connection meaning no physical cables are used to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the portable electronic devices 103. Suitable variations of the communication system will be understood to a person of skill in the art and are intended to fall within the scope of the present disclosure.

Figure 2:
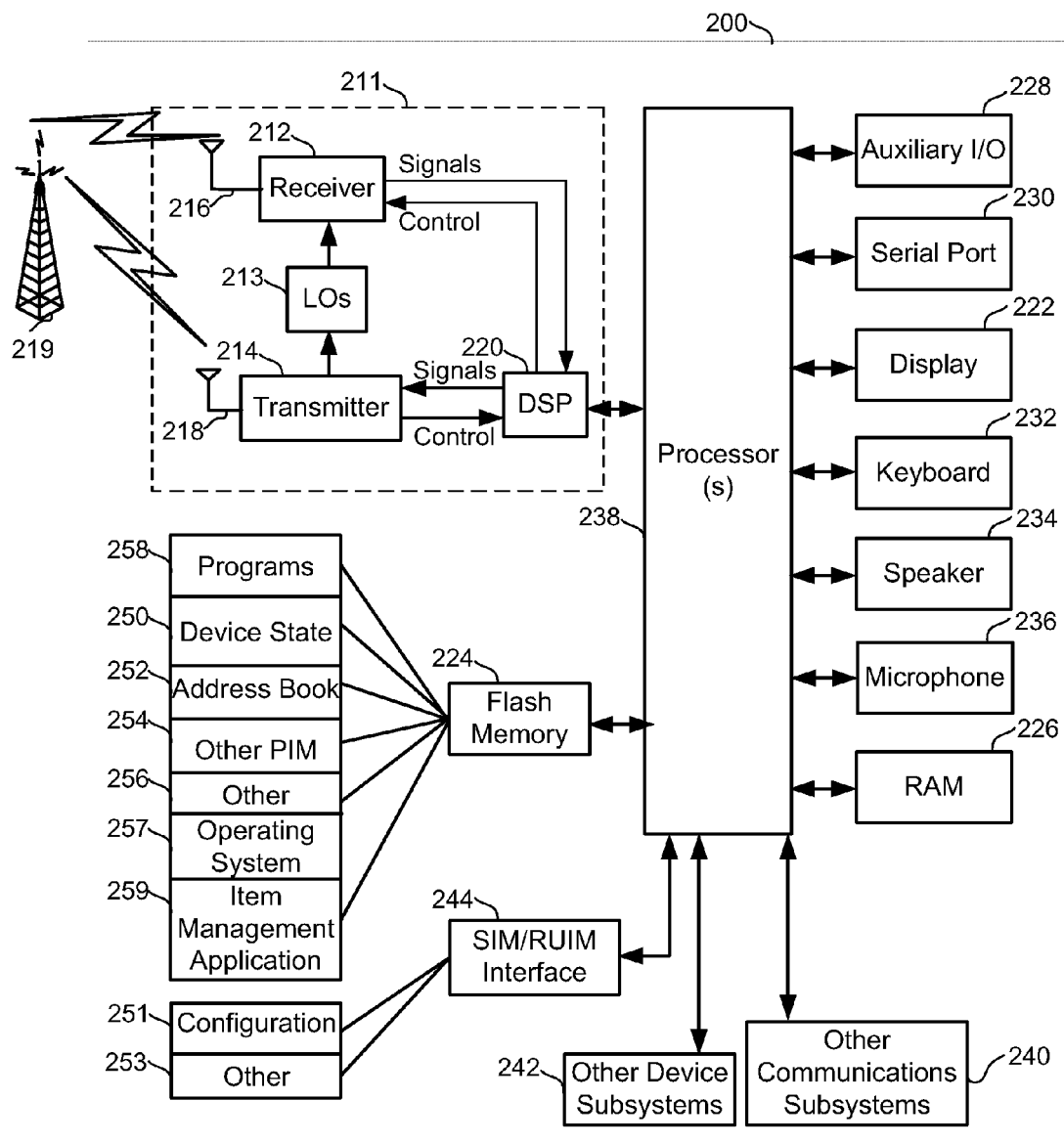
FIG. 2 is a simplified block diagram of one example of a portable electronic device in accordance with the present disclosure.

Referring to FIG. 2, a block diagram of a portable electronic device, such 103, in accordance with an example embodiment is illustrated. The portable electronic device may communicate over the communications system of FIG. 1 or may be a stand alone device that does not include communications capability. As shown, the device 200 includes a microprocessor 238 that controls the operation of the portable electronic device 200. A communication subsystem 211 performs communication transmission and reception with the wireless network 219. The microprocessor 238 further can be communicatively coupled with an auxiliary input/output (I/O) subsystem 228 that can be communicatively coupled to the portable electronic device 200. In at least one embodiment, the microprocessor 238 can be communicatively coupled to a serial port (for example, a Universal Serial Bus port) 230 that can allow for communication with other devices or systems via the serial port 230. A display 222 can be communicatively coupled to microprocessor 238 to allow for displaying of information to an operator of the portable electronic device 200. When the portable electronic device 200 is equipped with a keyboard 232, the keyboard can also be communicatively coupled with the microprocessor 238. The portable electronic device 200 can include a speaker 234, a microphone 236, random access memory (RAM) 226, and flash memory 224 all of which may be communicatively coupled to the microprocessor 238. Other similar components may be provided on the portable electronic device 200 as well and optionally communicatively coupled to the microprocessor 238. Other communication subsystems 240 and other portable electronic device subsystems 242 are generally indicated as being functionally connected with the microprocessor 238 as well. An example of a communication subsystem 240 is a short range communication system such as BLUETOOTH® communication module or a WI-FI® communication module (a communication module in compliance with IEEE 802.11b) and associated circuits and components. Additionally, the microprocessor 238 is able to perform operating system functions and enables execution of programs on the portable electronic device 200. In some embodiments not all of the above components may be included in the portable electronic device 200. For example, in at least one embodiment the keyboard 232 is not provided as a separate component and is instead integrated with a touch screen as described below.

The auxiliary I/O subsystem 228 can take the form of a variety of different navigation devices (multi-directional or single-directional) such as a trackball navigation device, a thumbwheel, a navigation pad, a joystick, touch-sensitive interface, or other I/O interface. These navigation devices may be located on the front surface of the portable electronic device 200 or may be located on any exterior surface of the portable electronic device 200. Other auxiliary I/O subsystems may include external display devices and externally connected keyboards (not shown). While the above examples have been provided in relation to the auxiliary I/O subsystem 228, other subsystems capable of providing input or receiving output from the portable electronic device 200 are considered within the scope of this disclosure. Additionally, other keys may be included to function as escape keys, volume control keys, scrolling keys, power switches, or user programmable keys, and may likewise be programmed accordingly.

The keyboard 232 can include a plurality of keys that can be of a physical nature such as actuable buttons, or they can be of a software nature, typically constituted by representations of physical keys on a display screen 222 (referred to herein as "virtual keys"). It is also contemplated that the user input can be provided as a combination of the two types of keys. Each key of the plurality of keys is associated with at least one action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display screen 222 which in one embodiment is enabled by touching the display screen 222, for example, with a stylus, finger, or other pointer, to generate the character or activate the indicated command or function. Some examples of display screens 222 capable of detecting a touch include resistive, capacitive, projected capacitive, infrared and surface acoustic wave (SAW) touch screens.

Physical and virtual keys can be combined in many different ways as appreciated by those skilled in the art. In one embodiment, physical and virtual keys are combined such that the plurality of enabled keys for a particular program or feature of the portable electronic device 200 is shown on the display screen 222 in the same configuration as the physical keys. Using this configuration, the operator can select the appropriate physical key corresponding to what is shown on the display screen 222. Thus, the desired character, command or function is obtained by depressing the physical key corresponding to the character, command or function displayed at a corresponding position on the display screen 222, rather than touching the display screen 222.

Furthermore, the portable electronic device, e.g. 200 is equipped with components to enable operation of various programs, as shown in FIG. 1. In an example embodiment, the flash memory 224 is enabled to provide a storage location for the operating system 257, device programs 258, item management application 259 and data. The operating system 257 is generally configured to manage other programs 258 that are also stored in memory 224 and executable on the processor 238. The operating system 257 honors requests for services made by programs 258 through predefined program 258 interfaces. More specifically, the operating system 257 typically determines the order in which multiple programs 258 are executed on the processor 238 and the execution time allotted for each program 258, manages the sharing of memory 224 among multiple programs 258, handles input and output to and from other device subsystems 242, and so on. In addition, operators can typically interact directly with the operating system 257 through a user interface usually including the keyboard 232 and display screen 222. While in an example embodiment the operating system 257 is stored in flash memory 224, the operating system 257 in other embodiments is stored in read-only memory (ROM) or similar storage element (not shown). As those skilled in the art will appreciate, the operating system 257, device program 258 or parts thereof may be loaded in RAM 226 or other volatile memory.

In some embodiments, the flash memory 224 may contain programs 258 for execution on the device 200, including—but not limited to—an address book 252, a personal information manager (PIM) 254, and a device state 250. Furthermore, programs 258 and other information 256 including data can be segregated upon storage in the flash memory 224 of the device 200.

When the portable electronic device 200 is enabled for two-way communication within the wireless communication network 219, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the portable electronic device 200 may use a unique identifier to enable the portable electronic device 200 to transmit and receive signals from the communication network 219. Other systems may not use such identifying information. GPRS, UMTS, and EDGE use a Subscriber Identity Module (SIM) in order to allow communication with the communication network 219. Likewise, most CDMA systems use a Removable User Identity Module (RUIM) in order to communicate with the CDMA network. The RUIM and SIM card can be used in multiple different portable electronic devices 200. The portable electronic device 200 may be able to operate some features without a SIM/RUIM card, but it will not be able to communicate with the network 219. A SIM/RUIM interface 244 located within the portable electronic device 200 allows for removal or insertion of a SIM/RUIM card (not shown). The SIM/RUIM card features memory and holds key configurations 251, and other information 253 such as identification and subscriber related information. With a properly enabled portable electronic device 200, two-way communication between the portable electronic device 200 and communication network 219 is possible.

If the portable electronic device 200 is enabled as described above or the communication network 219 does not use such enablement, the two-way communication enabled portable electronic device 200 is able to both transmit and receive information from the communication network 219. The transfer of communication can be from the portable electronic device 200 or to the portable electronic device 200. In order to communicate with the communication network 219, the device 200 can be equipped with an integral or internal antenna 218 for transmitting signals to the communication network 419. Likewise the device 200 can be equipped with another antenna 216 for receiving communication from the communication network 219. These antennae (216, 218) in another example embodiment are combined into a single antenna (not shown). As one skilled in the art would appreciate, the antenna or antennae (216, 218) in another embodiment can be externally mounted on the portable electronic device 200.

When equipped for two-way communication, the portable electronic device 200 features a communication subsystem 211. As is understood in the art, this communication subsystem 211 is modified so that it can support the operational needs of the portable electronic device 200. The subsystem 211 includes a transmitter 214 and receiver 212 including the associated antenna or antennae (216, 218) as described above, local oscillators (LOs) 213, and a processing module that in the presently described example embodiment is a digital signal processor (DSP) 220.

It is contemplated that communication by the portable electronic device 200 with the wireless network 219 can be any type of communication that both the wireless network 219 and portable electronic device 200 are enabled to transmit, receive and process. In general, these can be classified as voice and data. Voice communication generally refers to communication in which signals for audible sounds are transmitted by the portable electronic device 200 through the communication network 219. Data generally refers to all other types of communication that the portable electronic device 200 is capable of performing within the constraints of the wireless network 219.

Example device programs that can depend on such data include email, contacts and calendars. For each such program, synchronization with home-based versions of the program can be desirable for either or both of their long term and short term utility. As an example, emails are often time-sensitive, so substantially real time (or near-real time) synchronization may be desired. Contacts, on the other hand, can be usually updated less frequently without inconvenience. Therefore, the utility of the portable electronic device 200 is enhanced when connectable within a communication system, and when connectable on a wireless basis in a network 219 in which voice, text messaging, and other data transfer are accommodated. Device 200 can include programs such as a web browser, a file browser, and client programs for interacting with server programs. Devices, e.g., 103, 200, for use in the technology can be characterized by an identification number assigned to the device. Such identification numbers cannot be changed and are locked to each device.

A web browser is a software application for retrieving, presenting, and traversing information resources on the World Wide Web. An information resource can be identified by a Uniform Resource Identifier (URI), e.g., a Uniform Resource Locator (URL), and may be a web page, image, video, or other piece of content. Hyperlinks present in resources enable users to navigate browsers to related resources. Although browsers are primarily intended to access the World Wide Web, they can also be used to access information provided by servers in private networks or files in file systems. Some browsers can be also used to save information resources to file systems. Browsers are frequently used to access Web search engines such as Google™ search services, Bing™ search services, and services such as Wikipedia® encyclopedia. Browsers typically have an address bar for entering URLs. An address bar (also location bar or URL bar) is a widget in a web browser that either reflects the current URL or accepts typing-in a target URL.

A mobile browser, also called a micro-browser, mini-browser or wireless internet browser (WIB), is a web browser designed for use on a mobile device such as device 103.

Mobile browser software is typically smaller and more memory-efficient than desktop browser software to accommodate the low memory capacity and low-bandwidth of wireless handheld devices. The mobile browser usually connects, as described above in connection with FIG. 1, via a cellular network, or increasingly via Wireless LAN, e.g., 114, using standard HTTP over TCP/IP and displays web pages written in HTML, XHTML Mobile Profile (WAP 2.0), or WML. WML and HDML are stripped-down formats suitable for transmission across limited bandwidth, and wireless data connection called WAP.

Mobile browsers can be configured so as to display Web content for small screens on portable devices. The limited screen area of mobile devices puts display area at a premium. It would be beneficial to increase both the area, and the amount of time, allocated to displaying content over displaying controls in a mobile browser.

Figure 3:
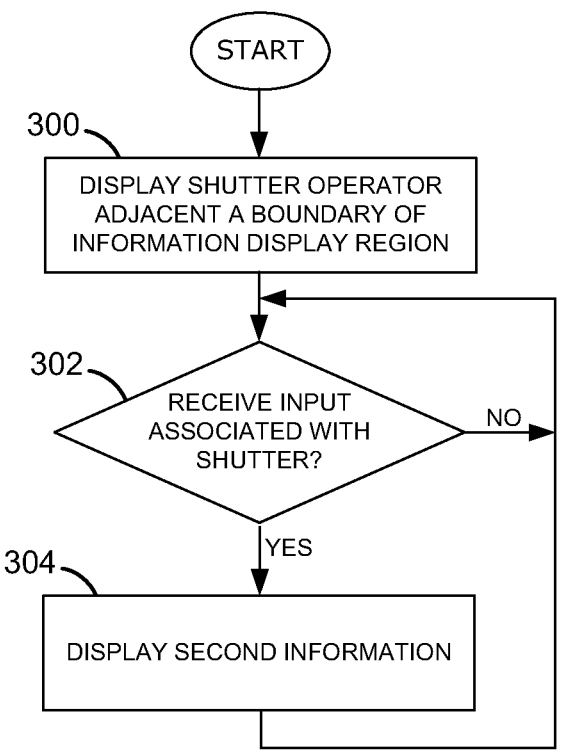
FIG. 3 is a flowchart illustrating an example of a method of controlling a portable electronic device in accordance with the present disclosure.

FIG. 3 is a flowchart illustrating an example of a method of controlling a portable electronic device 103, 200. The method may be carried out by software executed by, for example, the processor 238. Coding of software for carrying out such a method is within the scope of a person of ordinary skill in the art given the present description. The method may contain additional or fewer processes than shown and described, and may be performed in a different order. Computer-readable code executable by, for example, the processor 238 of the portable electronic device 103 to perform the method, may be stored in a computer-readable medium.

The method of FIG. 3 includes displaying 300 a shutter adjacent a boundary of an information display region on a display screen of a portable electronic device, the information display region for displaying first information, receiving 302 input associated with the shutter and displaying 304 second information. The second information may be related to the first information or may be independent of the first information. The second information may be configured to receive input that may be used to modify the first information displayed in the display region.

Figure 4:
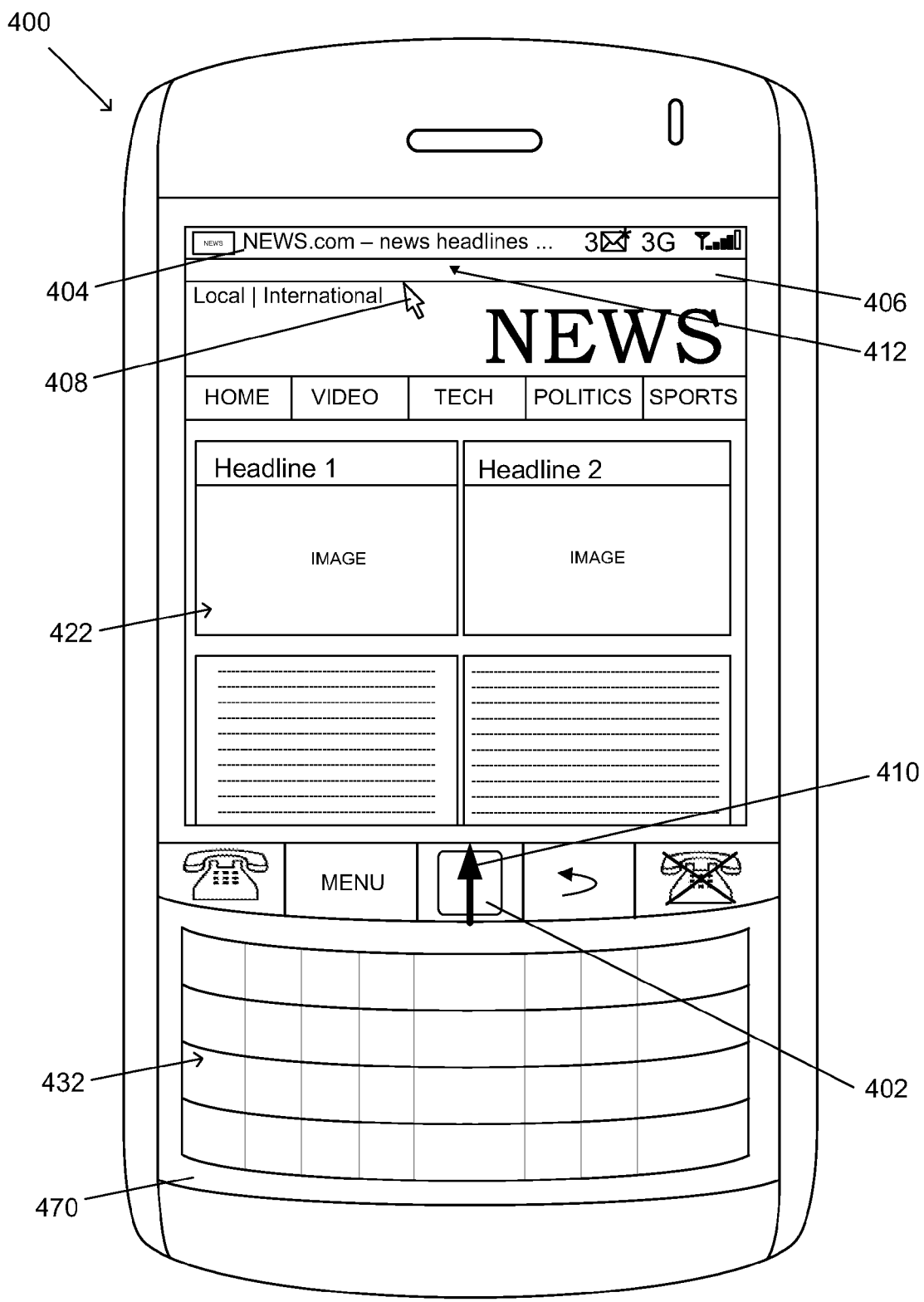
FIGS. 4, 5 and 6 illustrate an example of a portable electronic device receiving input at a navigation device in accordance with the present disclosure.
Figure 5:
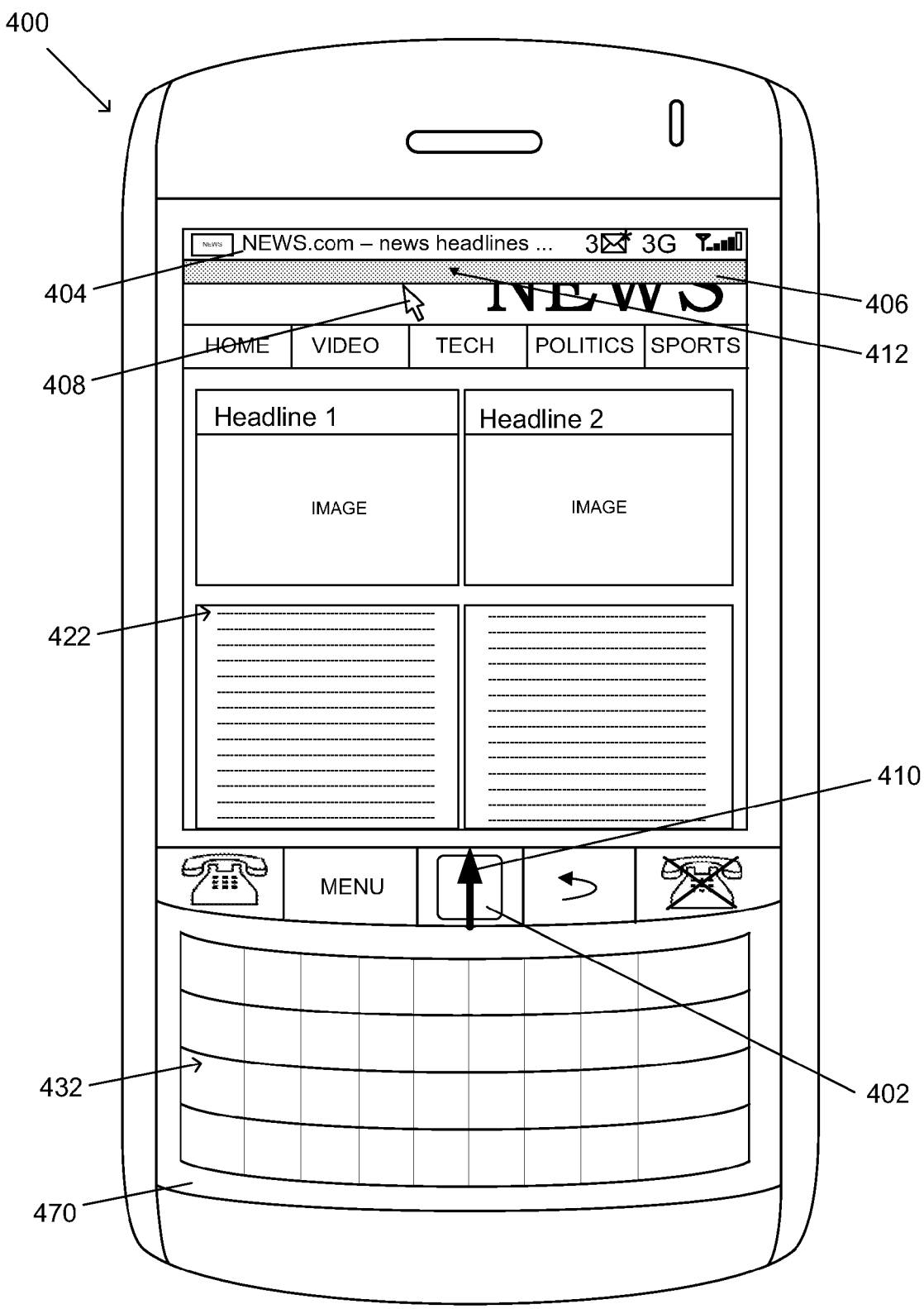

Continued reference is made to FIG. 3 with additional reference to FIGS. 4 and 5 to describe one example of a method of controlling the portable electronic device 103, 200. As shown in FIG. 3, the example portable electronic device 400 (as another example of 103) comprises a display 422 located above a keyboard 432 to facilitate user input and being suitable for accommodating textual input to the device 400. The device 400 includes an auxiliary input that acts as a navigation device 402 for moving an indicator 408 and that may be also exteriorly located upon a front face 470 of the device 400. The location of the cursor navigation device 402 allows the tool to be thumb-actuable, e.g., similar to keys of the keyboard 432. The embodiment shown in FIGS. 3 and 4 provides the navigation device 402 in the form of an optical trackpad, that may be utilized to instruct two-dimensional screen cursor movement in substantially any direction. Other embodiments can provide the navigation device in the form of a trackball, a touchpad, a pointing stick, joystick, graphics tablet, or combinations thereof. The placement of the navigation device 402 may be above the keyboard 432 and below the display screen 422 to avoid interference during keyboarding and avoid blocking the operator's view of the display screen 422 during use.

In the present example, a shutter 406 is displayed 300 adjacent to a banner 404 of a mobile browser on a display screen 422 of a device 400, the mobile browser displaying information received from a website using a mobile browser. The information may be scrolled using the navigation device 402, as indicated by arrow 410. When an indicator 408 is scrolled to the top of the display 422 and is adjacent to the banner 404, the shutter 406 may be highlighted, as shown in FIG. 5. Location of the indicator 408 on top of the banner 404 may also cause the shutter to be highlighted. When an input associated with the shutter 406 is received 302, a browser address bar 500 is displayed 304 below the banner 404.

The browser address bar 500 may receive input, in an editable URL (Uniform Resource Locator) display region 502, for example, that may modify the first information displayed in the display region. The shutter 406 may include a shutter operator 412, which generally indicates the direction of expansion in order to display the second information or the direction of contraction in order to hide the second information. The browser address bar 500 may include the editable URL display region 502 such as www.news.com, for example, a security lock indicator 504, a URL actions icon 506, and a browsing sessions switcher 508. The banner 404 can remain displayed above the browser address bar 500, as shown. In some embodiments, the browser address bar 500 can appear in place of the banner 404. Further, information and controls in addition to, and in place of, the information and controls described above, such as zoom controls, URI/URL corresponding to at least one link displayed on the device, time and date and search engine controls, for example, can be displayed in the browser address bar 500.

The banner 404 displays device related information such as an icon and title of the current displayed page, the total number of messages in an e-mail inbox of the device along with an asterisked envelope indicating the number of unread messages, e.g., "3;" an indication of an active mobile communication network to which the device is connected, e.g., "3G;" and an indication of signal strength.

In some embodiments, the browser address bar 500 can be displayed upon the device receiving an action, such as selection of the shutter 406 or shutter operator 412 on the display 422, selection of a menu command to display the browser address bar 500, positioning a cursor over the shutter or shutter operator, positioning of the indicator 408 over the banner 404, or selection of the banner 404. In some embodiments, the shutter 406 may not be continuously displayed. The device can display the shutter 406 or shutter operator 412 upon receiving an action for displaying the shutter such as selecting the banner 404, bumping the indicator into a boundary, hovering the indicator over a predetermined area of the display using the navigation device 402 or clicking a predetermined area of the display using the navigation device 402. The browser address bar 500 may then be displayed upon receiving a subsequent action.

Figure 6:
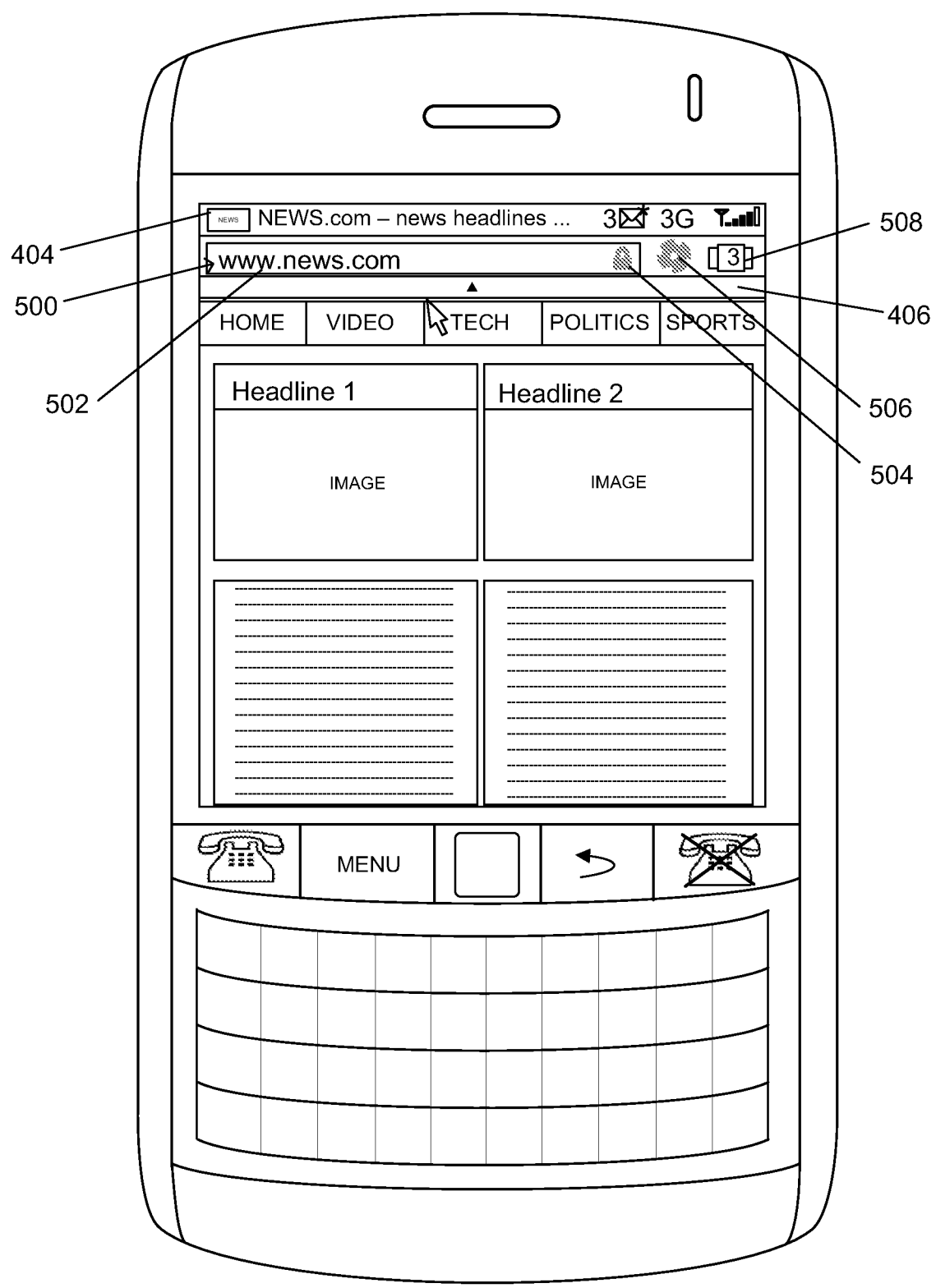

The shutter 406, shutter operator 412 or both can appear at different positions on the display 422. The shutter 406 can appear at the top of the display 422, as shown in FIGS. 4, 5 and 6, or can appear at a side or bottom of the display 422, for example. The shutter operator 412 can be displayed with or without the shutter 406.

In one example, the shutter is not continuously displayed on the display. The shutter can be displayed when an indicator is adjacent to the shutter and scrolling input is received at a navigation device, the scrolling input being directed toward the shutter.

Figure 7:
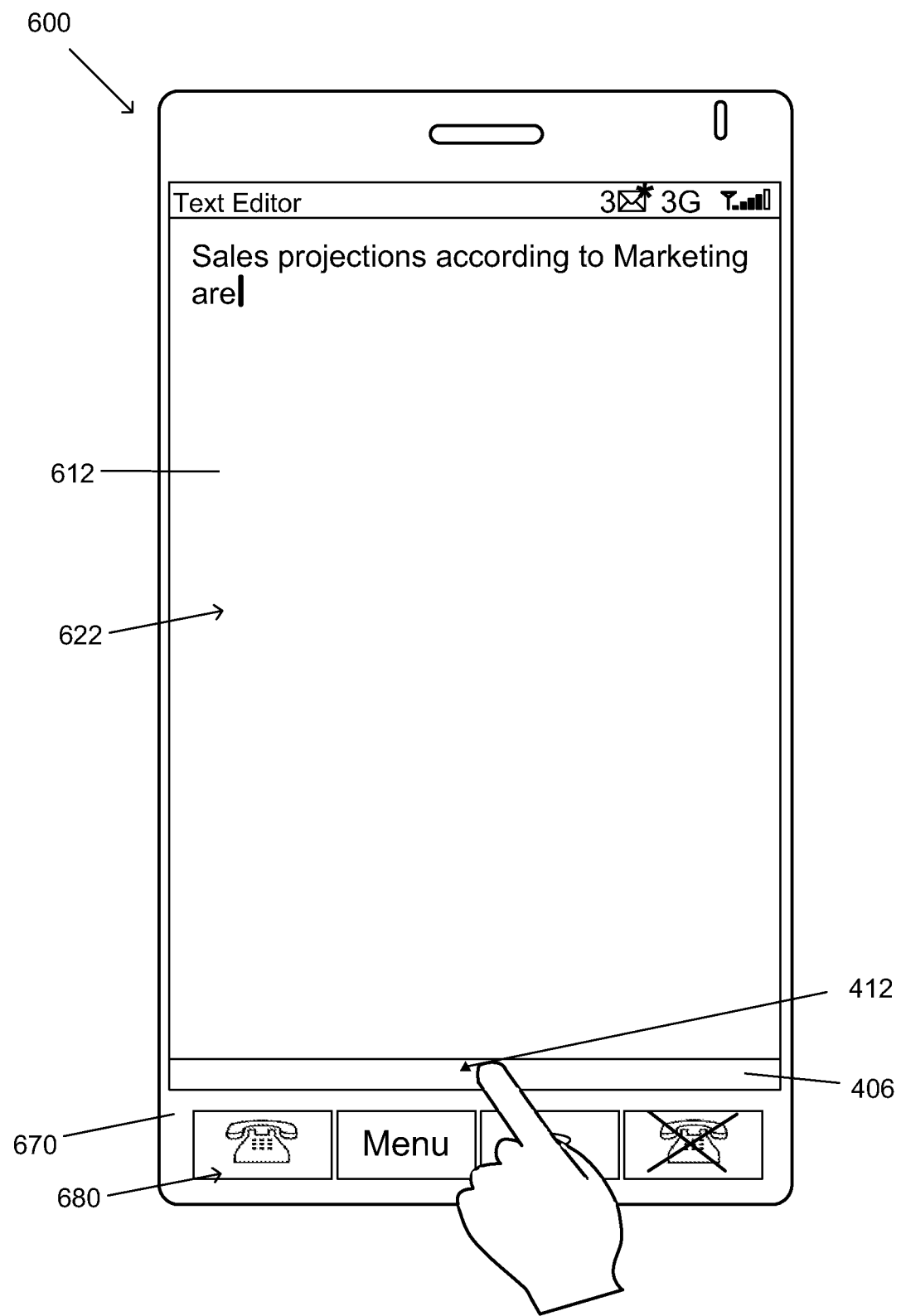
FIGS. 7 and 8 illustrate other examples of a portable electronic device receiving input in accordance with the present disclosure.
Figure 8:
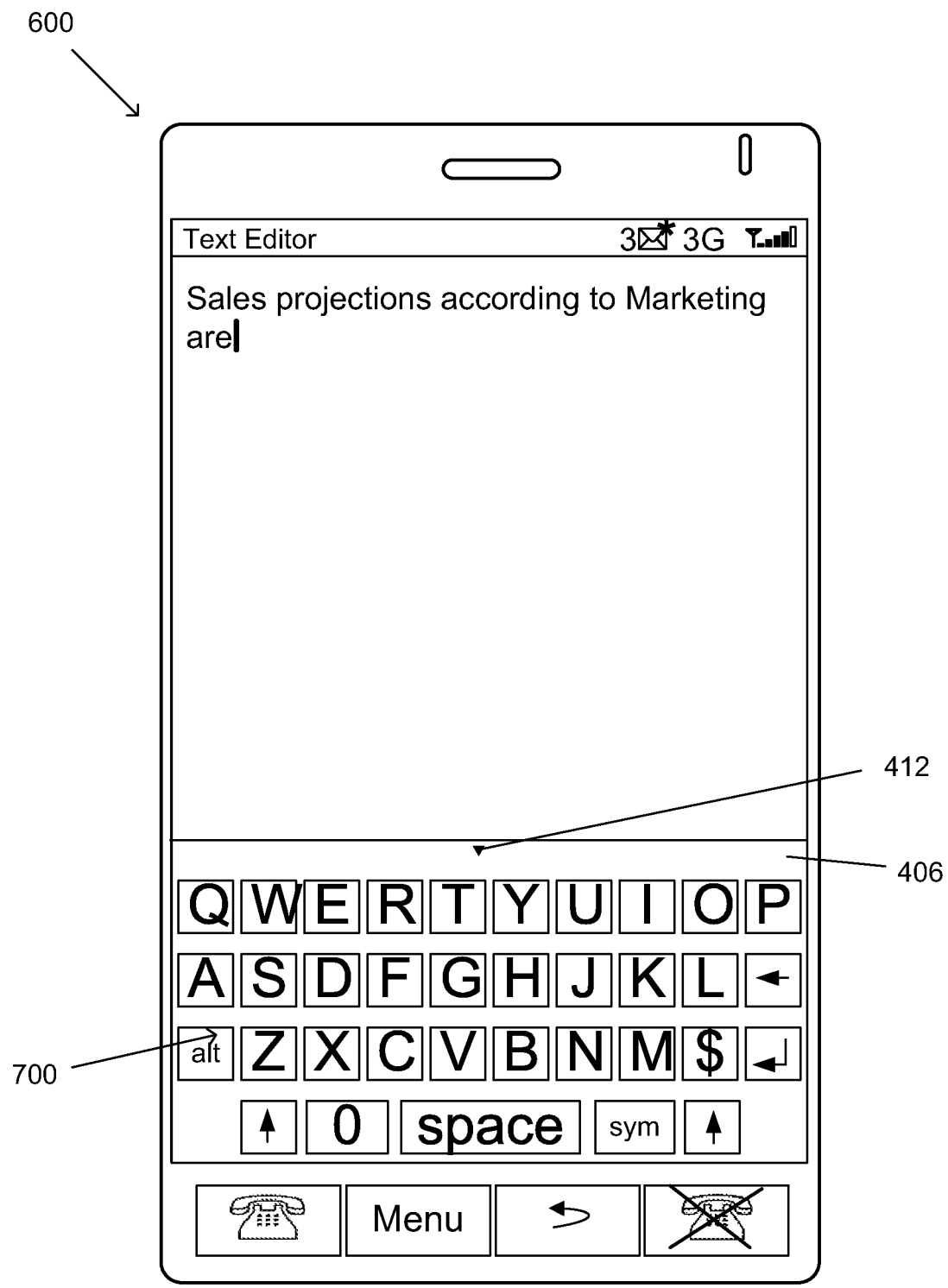

Continued reference is made to FIG. 3 with additional reference to FIGS. 7 and 8 to describe another example of a method of controlling the portable electronic device 103, 200. As shown in FIG. 7 and FIG. 8, an example portable electronic device 600 (as another example of 103) comprises a touch-sensitive display 622 for accommodating input to the device 600. In some embodiments, a keyboard (not shown) can be part of the touch-sensitive display 622. A front face 670 of the device 600 has a navigation row 680. As shown, the device 600 is generally of uni-body construction. The device 600 can be configured to send and receive messages. The device 600 includes a body 671 that may, in some embodiments, be configured to be held in one hand by an operator of the device 600 during text entry. A display 622 is included that is located on a front face 670 of the body 671 and upon which information is displayed to the operator, e.g., during text entry. Further, the device 600 can be configured to operate a web browser.

The touch-sensitive display 622 can be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display can include a capacitive touch-sensitive overlay. The overlay can be an assembly of multiple layers in a stack including, for example, a substrate, a ground shield layer, a barrier layer, one or more capacitive touch sensor layers separated by a substrate or other barrier, and a cover. The capacitive touch sensor layers can be any suitable material, such as patterned indium tin oxide (ITO).

One or more touches, also known as touch contacts or touch events, can be detected by the touch-sensitive display 622. The processor 238 can determine attributes of the touch, including a location of a touch. Touch location data can include an area of contact or a single point of contact, such as a point at or near a center of the area of contact. The location of a detected touch can include x and y components, e.g., horizontal and vertical components, respectively, with respect to one's view of the touch-sensitive display 622. For example, the x location component can be determined by a signal generated from one touch sensor, and the y location component can be determined by a signal generated from another touch sensor. A signal is provided to the controller of the touch-sensitive display 622 in response to detection of a touch. A touch can be detected from any suitable object, such as a finger, thumb, appendage, or other items, for example, a stylus, pen, or other pointer, depending on the nature of the touch-sensitive display 622. Multiple simultaneous touches can be detected.

The touch-sensitive display 622 is also configured to detect a gesture. A gesture, such as a swipe, is a type of touch, that begins at an origin point and continues to a finishing point while touch contact is maintained. A swipe can be long or short in distance, or duration, or both distance and duration. Two points of the swipe can be utilized to determine a vector that describes a direction of the swipe. The direction can be referenced with respect to the touch-sensitive display 622, the orientation of the information displayed on the touch-sensitive display 622, or another reference. For the purposes of providing a reference, "horizontal" as utilized herein is substantially left-to-right or right-to-left relative to the orientation of the displayed information, and "vertical" as utilized herein is substantially upward or downward relative to the orientation of the displayed information. The origin point and the finishing point of the swipe can be utilized to determine the magnitude or distance of the swipe. The duration of the swipe can be determined from the origin point and finishing point of the swipe in time. The processor 238 receives data from the controller to determine the direction, magnitude, and duration of the swipe. The gesture can be tracked and a plurality of sub-vectors determined for each gesture. The final sub-vector can be utilized to determine a distance and duration of a final portion of the gesture. The processor 238 receives data from the controller to determine the speed of the swipe based on the distance and duration of the final portion of the gesture.

Actuators can be disposed beneath the touch-sensitive display 622 and can be depressed or activated by applying sufficient force to the touch-sensitive display 622 to overcome the actuation force of the actuator. The actuators can provide input to the processor 238 when actuated. Actuation of the actuator(s) can result in provision of tactile feedback. Force sensors can work in combination with the actuators to measure an applied force. Force generally refers to force measurements, estimates, and/or calculations, such as pressure, deformation, stress, strain, force density, force-area relationships, thrust, torque, and other effects that include force or related quantities.

In the example of FIGS. 6 and 7, the shutter 406 is displayed 300 adjacent the bottom of an information display region, which is a text field 612 of a text editor or word processing application in this example, on the touch-sensitive display 622 of device 600. When a touch associated with the shutter is received 302, as shown in FIG. 7, a virtual keyboard is displayed 304, as shown in FIG. 8. The information displayed in the information display region can be text and other characters.

In touch-sensitive display embodiments, actions for displaying one or more of the shutter 406, shutter operator 412, and browser address bar 500 include touching the screen at a predetermined area, pressing and dragging toward or away from an edge of the display, hovering over a predetermined area of the display, touching a predetermined area of the display or touching the shutter or shutter operator.

Figure 9:
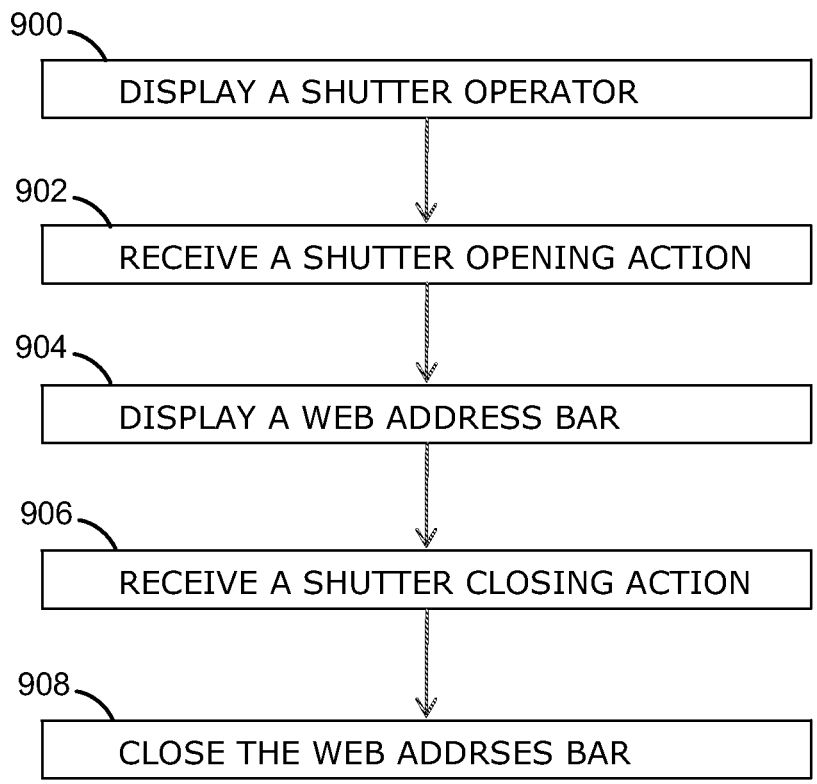
FIG. 9 is a flowchart illustrating another example of a method of controlling a portable electronic device in accordance with the present disclosure.

Referring to FIG. 9, another method of controlling a portable electronic device 103 is shown. The method includes: displaying 900 a shutter operator, receiving 902 a shutter opening action at the shutter operator, displaying 904 a browser address bar, receiving 906 a shutter closing action and closing 908 the address bar. Browser address bar closing actions include selecting the shutter operator, scrolling the browser address bar off the display, entering a web address in the an editable URL display region 502, selecting a URL actions icon 506 or browsing sessions switcher icon 508.

The methods described herein can be implemented using hardware, software or both hardware and software elements. In some embodiments, the methods are implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the methods described herein can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing a computer program product of the methods described herein and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some embodiments, the data processing system is implemented using one or both of FPGAs and ASICs.

Selective display of second information accessible via the shutter, may allow screen space for viewing first information to be increased. It will be appreciated that the shutter may be selected to display second information and hide second information. Alternatively, the shutter may be selected to display second information but not hide second information. Similarly, the shutter may be selected to hide second information but not display second information.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   displaying a shutter adjacent to a boundary of an information display region on a display of a portable electronic device, the information display region configured to display a virtual keyboard on a portion of the information display region and the shutter configured to activate and deactivate the virtual keyboard;
   the shutter including a shutter operator that indicates a direction of a scrolling input pointing away from the boundary of the information display region to display the virtual keyboard, the shutter operator changing to indicate a direction of a scrolling input pointing towards the boundary of the information display region to hide the virtual keyboard;
   receiving the scrolling input associated with the shutter; and
   responsive to receiving the scrolling input, displaying the virtual keyboard when the scrolling input is in the direction pointing away from the boundary of the information display region, and hiding the virtual keyboard when the scrolling input is in the direction pointing towards the boundary of the information display region.

2. A method as claimed in claim 1, wherein the shutter is continuously displayed.

3. A method as claimed in claim 1, wherein the boundary is at one of: a top, a side and a bottom of the information display region.

4. A method as claimed in claim 1, wherein the input is received from a navigation device, the navigation device being one of: an optical trackpad, a touch-sensitive display, a trackball, a pointing stick, a joystick and a graphics tablet.

5. A portable electronic device comprising:
   a display configured to display a shutter adjacent to a boundary of an information display region on the display, the information display region configured to display a virtual keyboard on a portion of the information display region and the shutter configured to activate and deactivate the virtual keyboard;
   the shutter including a shutter operator that indicates a direction of a scrolling input pointing away from the boundary of the information display region to display the virtual keyboard, the shutter operator changing to indicate a direction of a scrolling input pointing towards the boundary of the information display region to hide the virtual keyboard
   a navigation device for receiving the scrolling input associated with the shutter; and
   a processor communicatively coupled with the display and the navigation device, the processor configured to cause the display to display the virtual keyboard when the scrolling input is in the direction pointing away from the boundary of the information display region, and hide the virtual keyboard when the scrolling input is in the direction pointing towards the boundary of the information display region.

6. A portable electronic device as claimed in claim 5, wherein the navigation device is one of: an optical trackpad, a touch-sensitive display, a trackball, a pointing stick, a joystick and a graphics tablet.

7. A non-transitory computer readable medium comprising computer instructions which, when executed by a processor of a portable electronic device, cause the processor to:
   display a shutter adjacent to a boundary of an information display region on a display of a portable electronic device, the information display region configured to display a virtual keyboard on a portion of the information display region and the shutter configured to activate and deactivate the virtual keyboard;
   the shutter including a shutter operator that indicates a direction of a scrolling input pointing away from the boundary of the information display region to display the virtual keyboard, the shutter operator changing to indicate a direction of a scrolling input pointing towards the boundary of the information display region to hide the virtual keyboard;
   receive a scrolling input associated with the shutter; and
   responsive to receiving the scrolling input, display the virtual keyboard when the scrolling input is in the direction pointing away from the boundary of the information display region, and hide the virtual keyboard when the scrolling input is in the direction pointing towards the boundary of the information display region.

* * * * *